United States Patent [19]

Brush

[11] 4,061,063
[45] Dec. 6, 1977

[54] ROTARY SHEAR

[75] Inventor: John B. Brush, Cincinnati, Ohio

[73] Assignee: The Procter & Gamble Company, Cincinnati, Ohio

[21] Appl. No.: 754,421

[22] Filed: Dec. 27, 1976

[51] Int. Cl.$^2$ .................... B23D 19/06; B23D 25/12
[52] U.S. Cl. .......................................... 83/55; 83/332; 83/345; 83/348; 83/496; 83/501
[58] Field of Search ................ 83/331, 332, 333, 343, 83/345, 348, 496, 501, 55

[56] References Cited

U.S. PATENT DOCUMENTS

| 1,847,767 | 3/1932 | Koch | 83/332 X |
| 3,055,249 | 9/1962 | Lord | 83/501 |
| 3,682,032 | 8/1972 | Pfeiffer | 83/496 |

*Primary Examiner*—Willie G. Abercrombie
*Attorney, Agent, or Firm*—Melville, Strasser, Foster & Hoffman

[57] ABSTRACT

A high-speed rotary shear for making, in the direction of travel, straight cuts, curved cuts, and combinations thereof, through a continuously moving web of thin, pliable, compliant, cut-resistant material and a process of making such cuts. The shear comprises at least one pair of first and second cooperating blades located to either side of the web. Each of the first and second blades is mounted on a blade support affixed to a rotatable shaft. At least one of the first and second blades is in part at least elastically mounted on its support and is itself flexible. The axes of the shafts of said first and second blades lie in spaced horizontal planes and in vertical planes which intersect at an angle such that the first and second blades will be skewed with respect to each other at an angle of from about 1° to about 6° and such that the first and second blades, having the same outside diameter, will have a single point contact, cutting the web with a scissors action.

25 Claims, 12 Drawing Figures

ROTARY SHEAR

BACKGROUND OF THE INVENTION

1. Field of the Invention

The invention relates to means and a process for making straight cuts, curved cuts and combinations thereof through a continuously moving web, and more particularly to such a means and a process capable of making such cuts in thin, pliable, compliant, cut-resistant plastic and/or fibrous material.

2. Description of the Prior Art

Prior art workers have devised numerous types of rotary shears. One well known construction involves the use of a sharp disc-like blade and a rigid backup cylinder, producing a typical crush cut in a web of material. Another approach involves the use of two cooperating blades. A typical two-blade rotary shear is taught, for example, in U.S. Pat. No. 3,956,957 in the name of Louis Corse, issued May 18, 1976.

U.S. Pat. No. 559,179 in the name of Herman I. Koegel, issued Apr. 28, 1896 and U.S. Pat. No. 668,945 in the name of Aaron Allen, issued Feb. 26, 1901 teach rotary shears for cutting paper webs utilizing cooperating pairs of disc or dish-shaped blades located at a slight angle with respect to each other in order to provide single-point contact therebetween. The last mentioned reference also teaches spring loading one of the disc-like blades against the other.

U.S. Pat. No. 1,063,298 in the name of Henry C. Smith, issued June 3, 1913 and U.S. Pat. No. 3,364,701 in the name of George S. Rouyer and Marcel Duchemin, issued Jan. 23, 1968 set forth rotary shear-like apparatus employing specially configured blade elements for the cutting of sheet metal.

Finally, U.S. Pat. No. 3,459,086 in the name of George E. Reeder, Jr., issued Aug. 5, 1969 and U.S. Pat. No. 3,682,032 in the name of John D. Pfeiffer, issued Aug. 8, 1972 teach rotary shear or slitter apparatus for webs of paper and the like utilizing cooperating pairs of disc-like blades skewed with respect to each other so as to have a point contact therebetween. In both of these last mentioned references, the disc-like blades are specially configured to increase the life of their cutting edges.

While the rotary shear of the present invention may have many applications, it is particularly adapted to the formation of straight and curved cuts, and combinations thereof, at high cutting speeds through a continuously moving web of thin, pliable, compliant, cut-resistant material.

As a non-limiting example of such a web, reference is made to U.S. Letters Pat. No. 3,860,003 which teaches a disposable diaper construction wherein the diaper is made up of three basic parts: a flexible, moisture impermeable back sheet, an absorbent core and a porous, fibrous top sheet. The back sheet may be made of such material as low density, opaque polyethylene. The top sheet may be made of material such as woven or non-woven mixtures of small denier polyester and rayon fibers. The back sheet and top sheet are joined directly together at the diaper edges. In the usual mode of manufacture, the disposable diapers are formed in a continuous web which is ultimately severed into the individual diaper product. Each diaper, along its longitudinal edges, is provided with elongated notches so that the diaper is in part preformed. These longitudinal edge notches are preferably cut while the diapers are still in the form of a continuous web.

Unlike paper and metal structures which behave more or less like rigid bodies during a shearing operation, a thin, pliable, compliant web, such as that constituting the back and top sheets of the above described diaper structure, resists conventional shearing due to the compliant nature of the web, its tendency to bend, its small caliper which passes through any gaps in blade contact, the presence of small denier fibers difficult to cut and the basic cut resistance of a tough plastic-like polyester.

For purposes of an exemplary showing, the high-speed rotary shear and the process of the present invention will be described in terms of the formation of longitudinal edge notches in a web of disposable diaper material. The high-speed rotary shear and the shearing process are capable of producing straight cuts (parallel to or at an angle to the direction of web movement), curved cuts and combinations thereof in a web of such compliant material with a true shearing action similar to that produced by a pair of scissors or shears. Just what constitutes "high-speed" depends, of course, on the material being cut and the complexity of the cuts being made. In the embodiment described with the difficulty cut web described, the term "high speed" is intended to refer to a web speed of from about 200 to about 600 feet per minute or more. The rotary shear is provided with a blade arrangement wherein light weight blades are affixed at the periphery of disc-like or cylindrical blade supports and at least one of the blades is in part at least elastically mounted and is itself flexible. This provides a much lower blade inertia in use (as opposed to the use of a disc-like blade or the like), and enables the obtaining of the quick response necessary to provide a sharp, non-linear, clean and complete cut at regularly spaced intervals along the length of a rapidly moving compliant web having a low coeffecient of friction and which does not provide the rigid effect during the shearing operation as does paper, metal or the like. Inertia, of less importance in low speed devices, is of great importance in a high speed rotary shear of the type herein contemplated in the maintenance of single point contact between cooperating blades throughout each cut and to prevent dancing or bouncing of the blades which would preclude the obtaining of clean and complete cuts. Finally, the blade structures of the present invention demonstrate excellent working life and may be readily and easily replaced when required.

SUMMARY OF THE INVENTION

The high-speed rotary shear of the present invention and the process of the present invention are capable of making straight cuts, curved cuts, and combinations thereof, through a continuously moving web in the direction of travel of the web. The straight cuts may be parallel to or at an angle to the direction of web travel. The rotary shear and the process are particularly useful for forming cuts in webs of thin, pliable, compliant, cut-resistant material such as, for example, the plastic and/or fibrous webs used in the manufacture of disposable diapers.

In its simplest form the rotary shear comprises a pair of first and second cooperating blades, each mounted on a blade support affixed to a rotatable shaft. At least one of the first and second blades is in part at least elastically mounted on its support and is itself flexible. Both blades have the same outside diameter and overlap each other.

The axes of the shafts of the first and second blades lie in spaced, parallel horizontal planes and in vertical planes which intersect at an angle such that the first and second blades will lie in skewed relationship at an angle of from about 1° to about 6°. As a result the blades will have a single point contact, cutting the web with a scissors action.

As used herein and in the claims the word "horizontal" and "vertical" are intended for reference only, to set forth the relative relationship of the parts. Thus, for example, if the web passes through the shear in a vertical path of travel, then the shaft axes would lie in parallel vertical planes and angularly related planes normal to the vertical planes.

The supports for the first and second blades may have more than one blade affixed thereto and the shafts are driven in timed relationship so that cooperating pairs of first and second blades make single point contact throughout the entire length of the cut.

Both the first and second blades may be lightweight and elastically mounted to their supports. One of the first and second blades, on the other hand, may be fixedly mounted on its support and of heavy, non-flexible construction. The blades, where required, are provided with rake and clearance so that only the precise cutting edges make contact with each other, at one point, during the cutting operation.

In one exemplary embodiment two light weight, resilient first blades are elastically mounted to supports affixed to separate shafts joined together by a universal joint and oppositely skewed with respect to a third shaft carrying a pair of supports, each mounting a second blade adapted to cooperate with one of the first blades. The second blades are fixedly mounted to their respective supports.

In a second exemplary embodiment pairs of second blades are mounted at either end of a cylindrical support affixed to a single shaft. Two additional shafts, oppositely skewed with respect to the single shaft, each carry a pair of first blades adapted to cooperate with one of the pairs of second blades. Each second blade is of the nature of an anvil blade of heavy construction fixedly mounted to the cylindrical support. Each of the first blades has a central portion fixedly mounted to its support and flexible end portions of lesser width which are shiftable with respect to the support.

DESCRIPTION OF THE PREFERRED EMBODIMENTS

A first embodiment of the shear of the present invention is illustrated in FIGS. 1 through 12, wherein like parts have been given like index numerals. For purposes of an exemplary showing, the rotary shear of FIGS. 1 through 12 is illustrated as set up to cut spaced longitudinal notches in a continuous web of thin, pliable, complient, cut-resistant material. Such a web is illustrated at 1 in FIG. 17. The longitudinal notches are shown at 2 and 3. The notches on both edges of the web are identical. Each notch comprises a first portion 2a extending diagonally inward of the edge. The portion 2a leads to a curved portion 2b followed by a straight portion 2c. The straight portion 2c terminates in a second curved portion 2d leading to a second diagonal portion 2e extending back to the edge of the web. For purposes of description, the edge portions of web 1 wherein the notches 2 and 3 are formed may be considered to be a lamination of a plastic back sheet and a fibrous top sheet of the type used in the manufacture of disposable diapers.

Figure 1:
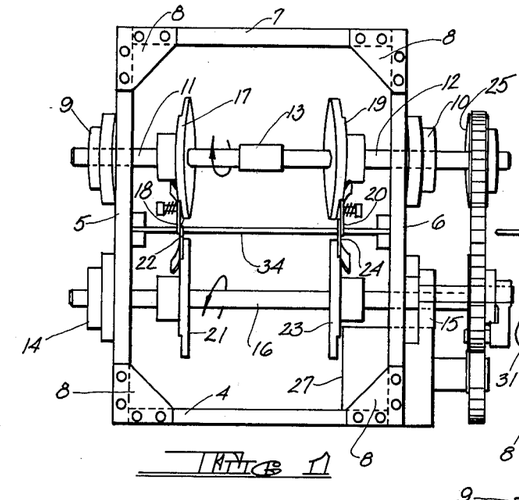
FIG. 1 is an elevational view of a rotary shear of the present invention.
Figure 2:
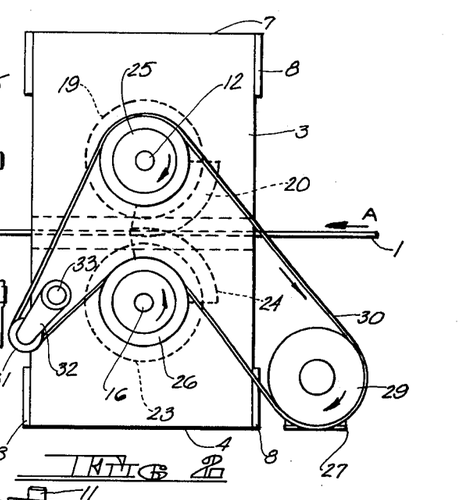
FIG. 2 is a side elevational view of the rotary shear as seen from the right of FIG. 1.
Figures 3, 4, 5:
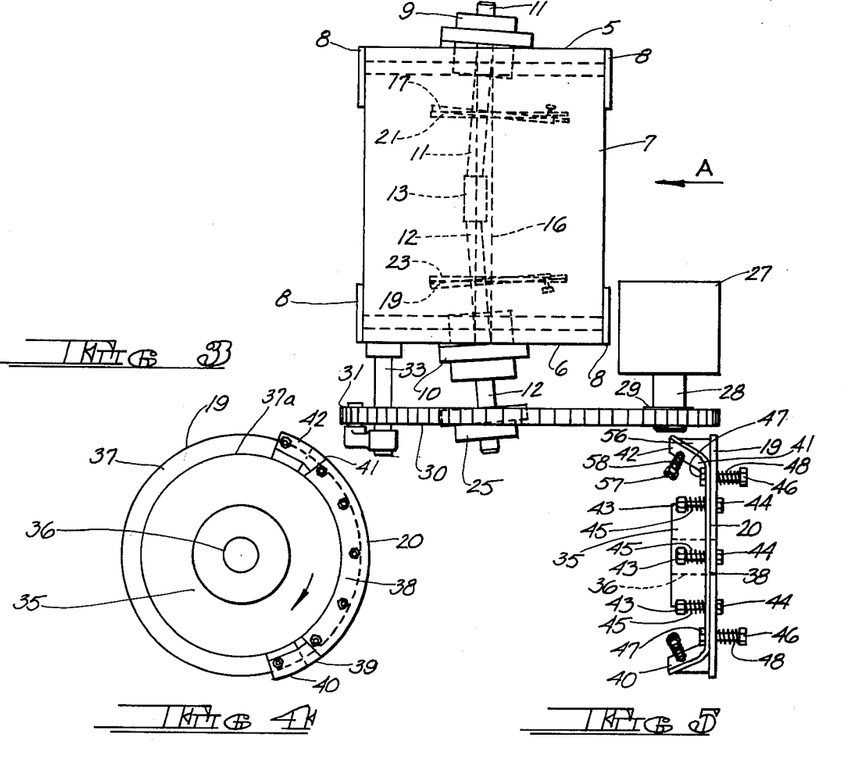
FIG. 3 is a plan view of the rotary shear of FIGS. 1 and 2.
FIG. 4 is an elevational view of a first or upper blade and support assembly of the rotary shear of FIG. 1.
FIG. 5 is an edge view of the blade and support assembly as seen from the right in FIG. 4.

Turning now to FIGS. 1 through 3, the shear comprises a frame, the nature of which does not constitute a limitation on the present invention. The frame is illustrated as comprising a bottom 4, sides 5 and 6 and a top 7. These elements may be secured directly together and additionally reinforced by corner plates 8.

Frame sides 5 and 6 have a pair of bearings 9 and 10 mounted thereon. The bearings 9 and 10 support a pair of shafts 11 and 12. As will be further explained hereinafter, it will be noted that bearings 9 and 10 are angled slightly with respect to the sides 5 and 6 with the result that the shafts 11 and 12 are not coaxial. The innermost ends of shafts 11 and 12 are connected by a universal joint 13. The sides 5 and 6 also support a second pair of bearings 14 and 15 in which a third shaft 16 is rotatively mounted.

The shaft 11 carries a disc-like blade support 17 with a flexible blade 18 affixed thereto. In similar fashion, the shaft 12 carries a blade support 19 mounting a flexible blade 20. The shaft 16 has affixed thereto a blade support 21 with a blade 22 and a second blade support 23 with a blade 24.

The web 1 is shown in FIG. 2 and its direction of travel is indicated by arrow A. The arrow A is also shown in FIG. 3. As is most clearly illustrated in FIGS. 1 and 3, the shaft 16 extends perpendicularly of the direction of travel of the web. As a result the faces of the blade supports 21 and 23 are parallel to the direction of web travel. As is evident from FIG. 1, the axes of shafts 11 and 12 and the axis of shaft 16 lie in parallel, spaced horizontal planes. As is shown in FIG. 3, however, the shafts 11 and 12 are oppositely skewed with respect to shaft 16, lying in vertical planes which intersect. As a result, the faces of blade holders 17 and 19 are not parallel to the direction of web travel, but rather flair slightly outwardly in the direction of web travel.

As a consequence of the above, the blade 18 is slightly skewed with respect to its cooperating blade 22. Similarly, blade 20 is slightly skewed with respect to its cooperating blade 24. In FIGS. 1 and 3, the angular relationships of shafts 11, 12 and 16 have been exaggerated for purposes of clarity. As will be discussed hereinafter, the blades 18 and 20 should be skewed with respect to their respective cooperating blades 22 and 24 at an angle of from about 1° to about 6°.

Since shaft 12 is connected to shaft 11 by means of universal joint 13, rotation imparted to shaft 12 will in turn be imparted to shaft 11. The free end of shaft 12 carries a sprocket 25. In similar fashion, the free end of shaft 16 carries a sprocket 26. A prime mover is shown at 27. The prime mover may take any appropriate form, as for example an electric motor. The motor 27 has an output shaft 28 to which is affixed a sprocket 29. A timing belt or chain 30 passes about the sprockets 25, 26 and 29, as is most clearly seen in FIG. 2. An additional idler sprocket 31 is mounted on an arm 32 which, in turn, is adjustably supported on a shaft 33. The sprocket 31 serves as a take up and assures that there is sufficient wrap of the timing belt or chain 30 about sprocket 26.

Where deemed necessary, the rotary shear may be provided with a support for the web 1 as it passes therethrough. To this end, a horizontal planar support 34 is most clearly shown in FIG. 1. It will be understood that the support will have cut-outs formed therein at the positions of the cooperating pairs of blades 18, 22 and 20, 24.

The blade support 19 and its blade 20 are illustrated in FIGS. 4 through 7. It will be understood that the support 17 and blade 18 may be identical. The support 19 comprises a disc having a hub 35. The hub has a central perforation 36 adapted to receive the shaft 12. The blade support 19 is non-rotatively affixed to shaft 12. This may be accomplished in any conventional manner including set screw means or the like (not shown) in hub 35.

The blade support 19 has a peripheral annular notch 37 on the same side as hub 35. The notch 37 forms an annular shoulder 37a of a width approximately equal to the thickness of blade 20.

The blade 20 has a body portion 38 the outermost edge of which constitutes an arc of a circle and provides the cutting edge. The innermost edge of body portion 38 is configured to lie against the blade support shoulder 37a. The cutting edge of body portion 38 conforms to the straight portion 2c of notch 2 (see FIG. 17). At its leading end, the blade has a curved portion 39 and another substantially straight portion 40 extending away from blade support 19. The cutting edges of these portions conform to notch portions 2b and 2a, respectively, of FIG. 17. Similarly, the trailing end of blade 20 has a curved portion 41 and a substantially straight portion 42 extending away from blade support 19. The cutting edges of portions 41 and 42 conform to notch portions 2d and 2e, respectively, of FIG. 17.

The body portion 38 is affixed to the blade support 19 by a series of bolts 43 and nuts 44. The bolts and nuts pass through perforations in the blade body portion 38 and the blade support 19 with clearance. The bolts carry compression springs 45 which bear against the blade body portion 38 at one end and the heads of bolts 43 at the other. Near the curved portions 39 and 41, additional bolts 46 and nuts 47 are provided, the bolts again pass through coaxial perforations in the blade body portion 38 and the blade support 19 with clearance. The bolts 46 carry compression springs 48 which bear against the heads of bolts 46 at one end and the blade support 19 at the other.

Figure 6:
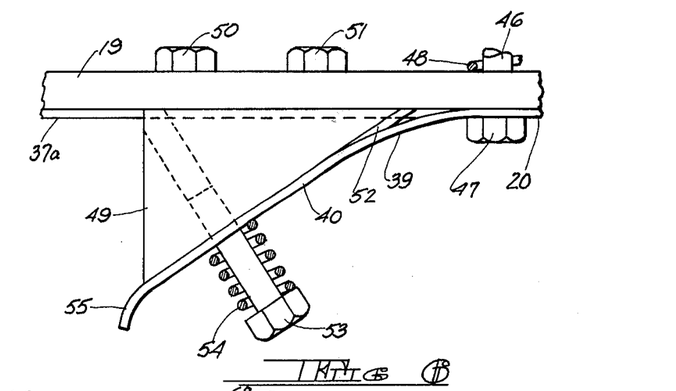
FIG. 6 is a fragmentary edge view of the blade and support assembly of FIG. 4, illustrating in plan the leading end of the blade and its support block.
Figure 7:
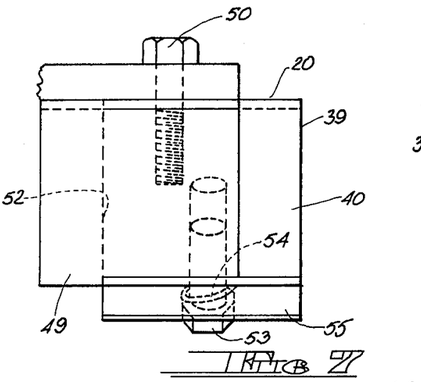
FIG. 7 is a fragmentary edge view of the blade and support assembly of FIG. 6, illustrating in end elevation the leading end of the blade and its support block.

The leading end of blade 20 is illustrated in FIGS. 6 and 7. A wedge-shaped metallic block 49 is mounted on blade support 19 by bolts 50 and 51. The block 49 is configured to support and abut the blade portion 40 in its normal configuration. It will be noted that the portions 39 and 40 of blade 20 are of lesser width than body portion 38. The block 49 has a shoulder 52 formed thereon to accommodate blade portion 40. A bolt 53 is threadedly engaged in block 49, passing through a perforation in blade portion 40 with clearance. The bolt 53 carries a compression spring 54 abutting the head of the bolt at one end and the blade portion 40 at the other. The forwardmost end of blade portion 40 may be bent outwardly as at 55 to serve as a lead-in when blade 20 coacts with blade 24, as will be described hereinafter.

The trailing end of blade 20 is configured substantially identically to the leading end, the cutting edges of the curved portion 41 and outwardly extending portion 42 corresponding to curved portion 39 and outwardly extending portion 30. The support for the portion 42 is essentially identical to that for portion 40. To this end, a metallic block 56, substantially a mirror image of block 49, is provided (see FIG. 5). A bolt 57 and compression spring 58 are also provided, being the equivalent of bolt 53 and compression spring 54 of FIG. 6. It will be evident from FIGS. 4 through 7 that the blade 20 is spring biased toward blade support 19, but is capable of limited lateral shifting and bending.

The lower or second blade support 23 and blade 24 are illustrated in FIGS. 8 through 11. It will be understood that the support 21 and blade 22 will be substantially identical. Support 23 is similar to support 19 previously discussed, and comprises a metallic disc provided with a hub 59 with a central perforation 60 adapted to receive shaft 16. As in the case of support 19, the support 23 is nonrotatively mounted to its shaft in any appropriate manner. Support 23 has an annular notch 61 at its periphery, forming an annular shoulder 61a.

Figure 8:
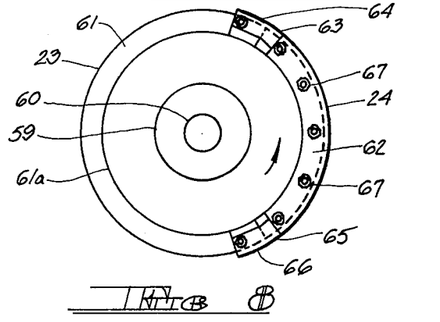
FIG. 8 is an elevational view, similar to FIG. 4, and illustrating a second or lower blade and support assembly of the rotary shear of FIG. 1.
Figure 9:
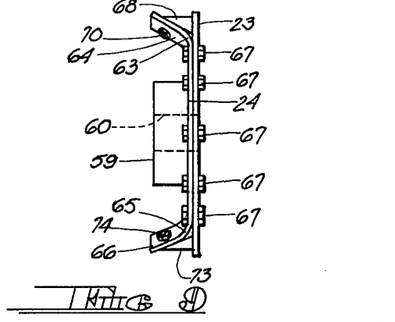
FIG. 9 is an edge view of the blade and support assembly as seen from the right of FIG. 8.

The blade 24 has a body portion 62 with a peripheral edge constituting an arc of a circle of the same radius as the peripheral surface of cooperating first or upper blade 20. Blade 24 has a leading end made up of a curved portion 63 and substantially straight portion 64 extending away from blade support 23. The trailing end of blade 24 has a similar curved portion 65 and substantially straight portion 66, again extending away from blade support 23. It will be noted that the body portion 62 has an inner edge configured to lie along the blade support shoulder 61a. Blade portions 63 and 64 at the leading end of the blade and blade portions 65 and 66 of the trailing end of the blade are narrower than the body portion 62.

The lower or second blade 24 differs from its cooperating upper or first blade 20 primarily in that it is fixedly secured to its blade support 23. To this end, the body portion 62 of blade 24 is firmly attached to blade support 23 by a series of bolts 67.

Figure 10:
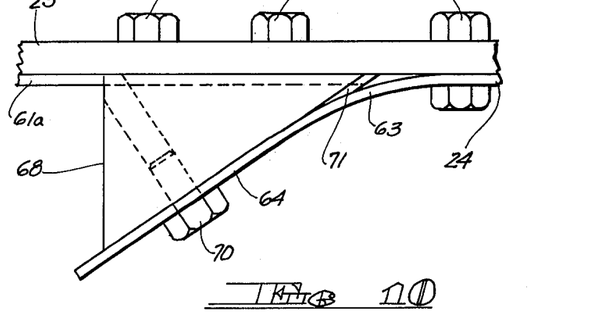
FIG. 10 is a fragmentary edge view of the blade and support assembly of the FIG. 8 illustrating in plan the leading end of the blade and its support block.
Figure 11:
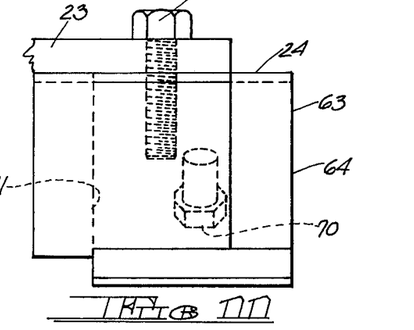
FIG. 11 is a fragmentary edge view of the blade and support assembly of FIG. 10, illustrating in end elevation the leading end of the blade and its support block.

The leading end of blade 24 is illustrated in FIGS. 10 and 11. As in the case of the leading end of blade 20, the blade portion 64 of blade 24 is supported by a wedge-shaped metallic block 68 affixed to the blade support 23 by bolts 69. The blade portion 64 is held firmly is abutment with the wedge-shaped block 68 by bolt 70. The block 68 has a shoulder 71 formed thereon, equivalent to the shoulder 52 of block 49.

It will be evident from FIG. 9 that the trailing end of blade 24 is similarly configured and supported. To this end, a block 73 is mounted on blade support 23. The block 73 is a metallic wedge-shaped block constituting substantially a mirror image of block 68. The portion 65 of the trailing end of blade 24 is held in firm abutment with block 73 by a bolt 74.

The trailing end of blade 20 may be provided with a lead in similar to that shown at 55 in FIG. 6 so that the rotary shear may be rotated in reverse for purposes of set up and adjustment. Such lead-in could be provided on fixed blade 24 instead of blade 20, at its lead end and at its trailing end, if desired.

The operation of the rotary shear thus far described may be set forth as follows. Reference is made to FIG. 2. When motor 27 is energized, sprocket 29 will rotate in a clock wise direction, as viewed in FIG. 2. Through the agency of timing belt or chain 30 and sprockets 25 and 26, shaft 12 (and also shaft 11) will be rotated in a clockwise direction and shaft 16 will be rotated in a counterclock wise direction. The rotation of shaft 12 (and shaft 11) will be synchronized with the rotation of shaft 16 by timing belt or chain 30. Blade support 19 and its blade 20 and blade support 23 and its blade 24 will be so oriented on their respective shafts 12 and 16 that blades 20 and 24 will properly coact with single point contact throughout their length except for initial lead in and final lead-out (i.e. throughout the time the blades are in contact). This will result in a scissors-like shearing of the edge portion of web 1 as it is drawn through the rotary shear under tension. Preferably the web is drawn through the rotary shear at a speed substantially equal to the peripheral speed of the blades. In fact, the web and the blades may be driven through the agency of the same prime mover. The blades 20 and 24 are so configured that with each coaction they will cut an elongated notch 2 in web 1 (see FIG. 17).

Blades 20 and 24 are essentially the reverse of each other, having cutting edges of the same diameter and being of the same length. The blades are preferably made of warpless steel.

Figure 17:
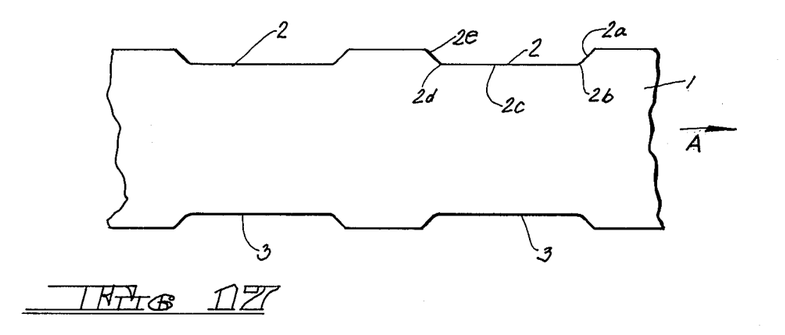
FIG. 17 is a fragmentary plan view of a web illustrating exemplary elongated edge notches capable of being cut by the rotary shear of FIG. 1.

At the time of coaction of blades 20 and 24, the outturned portion 40 of blade 20 will first have point contact with outturned portion 64 of blade 24 immediately after lead-in 55 and throughout the length of these portions. The lead-in 55 will assist initial contact between the blades. Blade portions 40 and 64 will form the portion 2a of notch 2 as seen in FIG. 17 (and assuming that the web 1 is moving in the direction of arrow A in FIG. 17). Next, the curved portion 39 of blade 20 will coact with curved portion 63 of blade 24 with the point contact between blades 20 and 24 moving therealong. This will produce the curved portion 2b of notch 2. If the curved portion 2b has a two inch radius, for example, then the inside or cutting edge of curved portion 39 of blade 20 will have a 2 inch radius and the outside or cutting edge of blade 24 at curved portion 63 will have a 2 inch radius. Next the straight body portions 38 of blade 20 and 62 of blade 24 will coact with a point contact graveling along their respective cutting edges to form the portion 2c of notch 2. The curved portion 2d of notch 2 will be formed by the curved portions 41 and 65 of blades 20 and 24, respectively, the point contact shifting along their cutting edges. The relationship of curved portions 41 and 65 are the same as that described with respect to curved portions 39 and 63. Finally, the point contact will shift along trailing portions 42 of blade 20 and 66 of blade 24 to form the portion 2e of notch 2.

Figure 12:
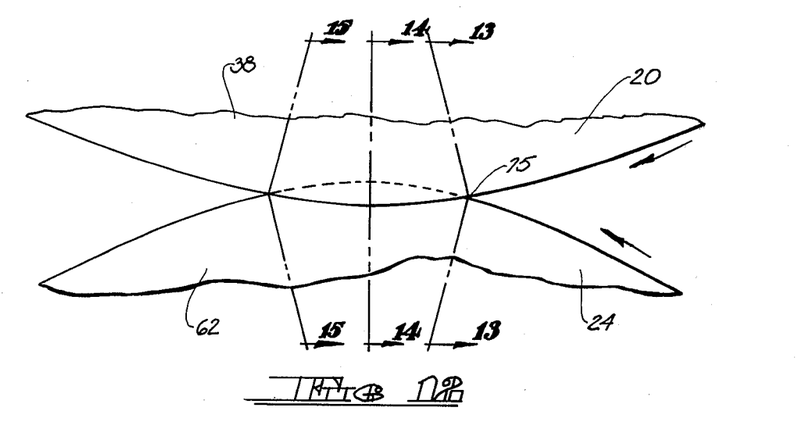
FIG. 12 is a fragmentary elevational view of a pair of first and second cooperating blades.
Figure 13:
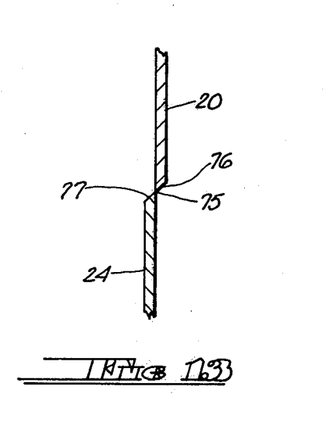
FIGS. 13, 14 and 15 are respectively fragmentary cross sectional views taken along section lines 13—13, 14—14 and 15—15 of FIG. 12.

Reference is now made to FIGS. 12 through 15 which illustrate the coaction of blades 20 and 24 at the cutting edges of their respective body portions 38 and 62. Blades 20 and 24 rotate in opposite direction as indicated by the arrows. At a given instant the point contact will occur at 75. FIG. 13 is a cross sectional view, the section line 13—13 of FIG. 12 lying along corresponding radii of blades 20 and 24. Again the point contact between the cutting edges of blades 20 and 24 is indicated at 75. It will be noted that both blades are provided with rake (i.e. the angle defined between surface 76 of blade 20 and the horizontal and surface 77 of blade 24 and the horizontal).

Figure 14:
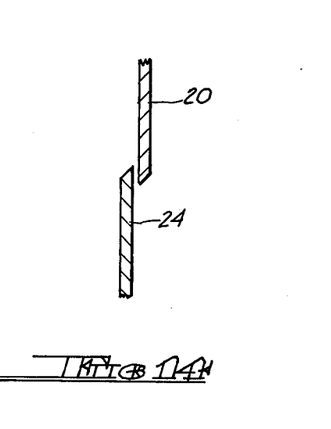

FIG. 14, which represents the cross section of blades 20 and 24 along section line 14—14, is taken along corresponding radii of blades 20 and 24. This defines the position of maximum overlap of blades 20 and 24 and it will be noted that the blades are spaced from each other. The spacing shown in FIG. 14 is exaggerated for purposes of clarity.

Figure 15:
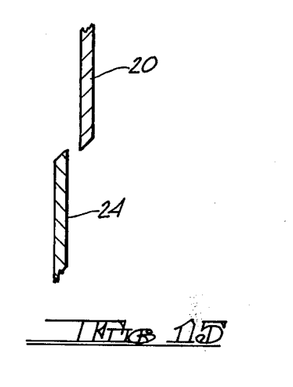

FIG. 15 illustrates blades 20 and 24 along section line 15—15. This section line in FIG. 12 is taken along corresponding radii of blades 20 and 24 defining the end point of their overlap. As shown in FIG. 15, the spacing between the blades has increased (again shown exaggerated for purposes of clarity).

Figure 16:
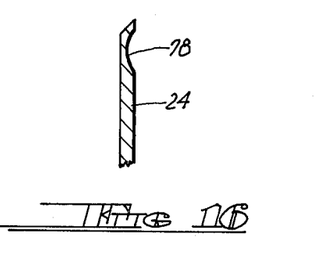
FIG. 16 is a fragmentary cross sectional view of the second blade near its leading end.

The angular relationship of blades 20 and 24 during coaction of their curved portions 39 and 63 as well as 41 and 65 are such that the curved portions 63 and 65 of blade 24 should have clearance ground therein. This clearance is illustrated in FIG. 16 at 78. FIG. 16 may be considered to be a cross sectional view of blade 24 either at curved portion 63 or at curved portion 65.

While theoretically possible, it would be too costly and impractical to manufacture blades 20 and 24 in rigid form with such perfect precision that a single point contact will obtain throughout the leading, trailing and curved portions of the blade without losing contact momentarily, especially at the blade velocities required for high production. Nevertheless, this loss of contact is avoided by the fact that blade 20 is elastically mounted to its support 19 and is itself flexible, assuring clean and complete cuts and avoiding ragged or partial cuts. It will be understood by one skilled in the art that blade 24 could be elastically mounted to its support 61 with blade 20 fixedly mounted on its support 19. Furthermore, both blades could be elastically mounted on their respective blade supports.

The blades 18 and 22 and their supports 17 and 21 are oppositely oriented with respect to blades 20 and 24 and their supports 19 and 23. Otherwise, the blades 18 and 22 coact in precisely the same manner described with respect to blades 20 and 24 to form the notches 3 in web 1 (see FIG. 17).

The arrangement just described results in sissors-like cuts with the cooperating pairs of blades demonstrating long life. This arrangement enables the formation of cuts at high cutting speeds in a continuously moving web along straight cut-lines in the direction of movement of the web, curved cut-lines. Cut-lines oriented at an angle to the direction of web movement and combinations thereof. The rotary shear of the present invention is also capable of making such cuts in a web of thin, pliable, compliant, cut-resistant material, again at high cutting speeds.

The rotary shear of the present invention may be provided with a single pair of cooperating support and blade assemblies making cuts through the web along any part thereof. In other words, the cuts need not be limited to spaced elongated notches at the edge of the web.

The number of blades on one of a cooperating pair of blade supports does not have to be equal to the number of blades on the other. It is only necessary that a cooperating pair of blades properly meet and coact during each shearing operation.

The maximum overlap of a cooperating pair of blades should perferably fall within the range of from about 1/16 to about ¼ inch for a 1 foot diameter cutting edge. For larger blades, the overlap between the blades can be greater. Finally, various means may be used to elastically mount at least one of the blades to its respective blade support. It would be within the scope of the invention to use elastomers, leaf springs, air pressure, magnetic pull, hydraulic pressure or the like.

Reference is now made to FIGS. 18 through 23 wherein another embodiment of the rotary shear of the present invention is illustrated. Again, like parts have been given like index numerals.

Figure 18:
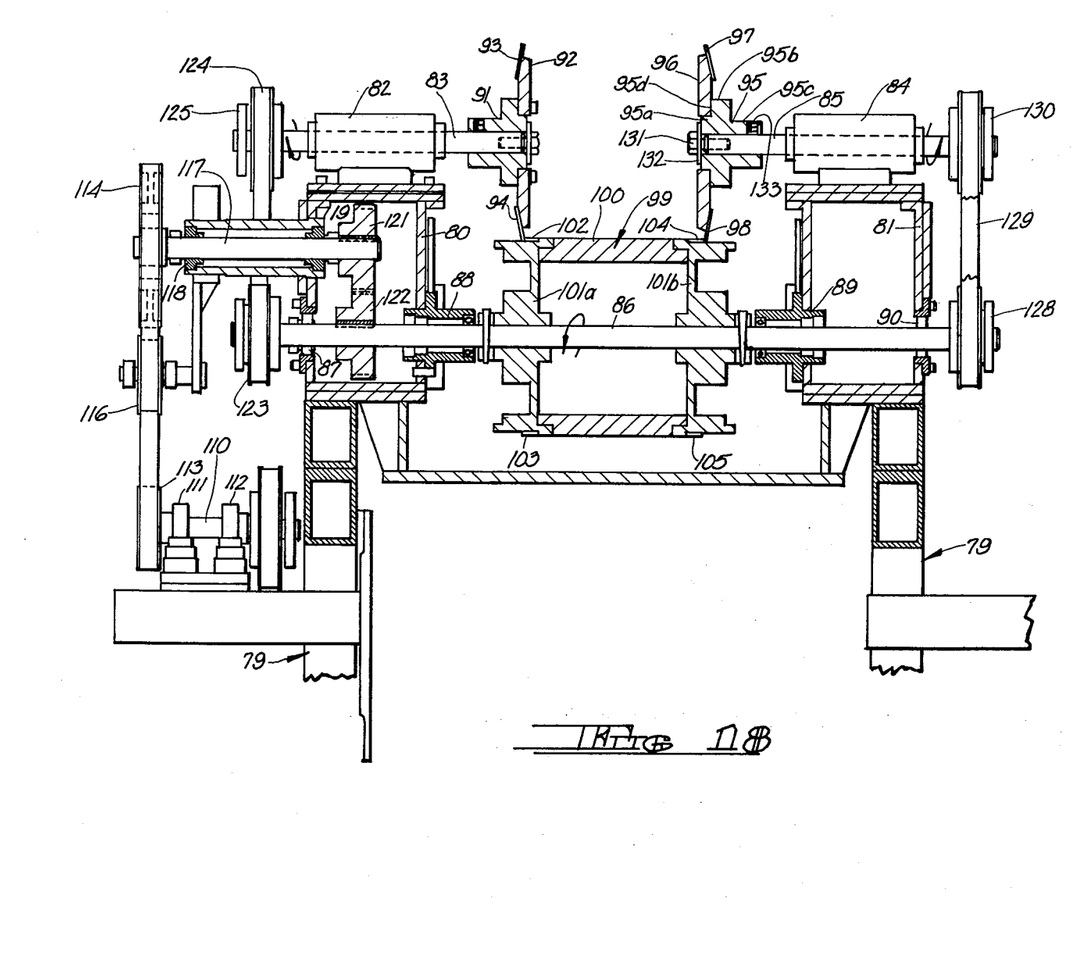
FIG. 18 is an elevational view partly in cross section, of another embodiment of the rotary shear of the present invention.
Figure 19:
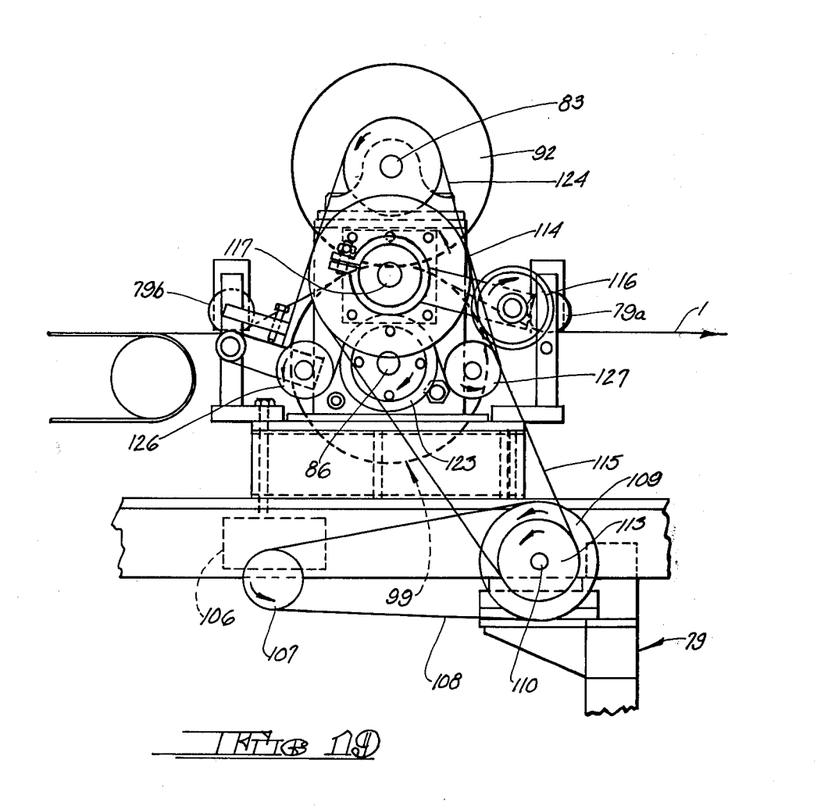
FIG. 19 is a side elevational view of the rotary shear as seen from the left of FIG. 18.

Referring first to FIGS. 18 and 19, the rotary shear is provided with an appropriate support structure generally indicated at 79. The nature of the support structure does not constitute a limitation on the present invention. Mounted on the support structure in parallel spaced relationship are a pair of housings 80 and 81. At the top of housing 80, a bearing 82 rotatively supports a shaft 83 which corresponds to the shaft 11 of FIG. 1. A similar bearing 84 is mounted on the top of housing 81 and rotatively carries a shaft 85 corresponding to shaft 12 of FIG. 1. Finally, a third shaft 86, corresponding to shaft 16 of FIG. 1, is rotatively mounted in bearings 87 and 88 in housing 80 and bearings 89 and 90 of housings.

Shaft 83 carries a hub 91 to which a blade support 92 is affixed, the blade support 92, in turn, carries a pair of blades 93 and 94. The blades 93 and 94 correspond to the blade 18 of FIG. 1. In a substantially identical manner, the shaft 85 carries a hub 95 with a blade support 96 and a pair of blades 97 and 98. The blades 97 and 98 correspond to the blade 20 of FIG. 1.

The shaft 86 carries a single blade support (generally indicated at 99) in the form of a cylindrical member 100 supported by end members 101a and 101b which are nonrotatively affixed to the shaft 86. On its end portion 101a the blade support 99 carries a pair of blades 102 and 103 corresponding to blade 22 of FIG. 1. On its other end portion 101b the cylindrical blade support carries a pair of blades 104 and 105 corresponding to blade 24 of FIG. 1.

The bearings 82 and 84 are so oriented on their respective housings 80 and 81 that the shafts 83 and 85 bear the same skewed relationship to shaft 86 as shafts 11 and 12 bear to shaft 16 in the embodiment of FIGS. 1 and 3.

As is shown in FIG. 19, the frame 79 also supports guide rolls 79a and 79b which assure sufficient wrap of web 1 about blade support 99 to stabilize the web laterally as it passes about blade support 99.

Rotation is imparted to the shafts 83, 85 and 86 in the following manner. A prime mover of any appropriate nature, as for example an electric motor, is mounted on the support structure as at 106 (see FIG. 19). The output shaft of motor 106 (not shown) carries a sprocket 107 connected by a timing belt or chain 108 to a sprocket 109 mounted on a shaft 110 (see FIG. 18). The shaft 110 is rotatively supported in bearings 111 and 112 and carries at its other end a sprocket 113. The sprocket 113 is, in turn, connected to a sprocket 114 by a timing belt or chain 115. Adjustment of timing belt or chain 115 may be accomplished through the agency of an adjustable take up wheel or sprocket 116, as is well known in the art.

The sprocket 114 is nonrotatively affixed to a shaft 117 rotatively mounted in bearings 118 and 119 located in an extension 120 on housing 80. The shaft 117, on its other end (within housing 80) carries a gear 121 nonrotatively mounted thereon. The gear 121 cooperates with a gear 122 nonrotatively mounted on shaft 86. In this way, the motor 106 imparts clockwise rotation to shaft 86 (as viewed in FIG. 19).

The end of shaft 86 which extends beyond housing 80 carries a sprocket 123 which is connected by a double-sided timing belt or chain 124 to a sprocket 125 mounted on the free end of shaft 83. As will be noted from FIG. 19, a pair of idler sprockets 126 and 127 will assure sufficient wrap of the double-sided timing belt or chain 124 about sprocket 123.

That end of shaft 86 which extends beyond housing 81 may be identically connected to shaft 85 to impart rotation thereto. To this end, the shaft 86 may be provided with a sprocket 128 interconnected by a double-sided timing belt or chain 129 to a sprocket 130 mounted on the free end of shaft 85. Again, a pair of idler sprockets (not shown) may be provided to assure sufficient wrap of timing belt or chain 129 about sprocket 128. As viewed from FIG. 19, the clockwise rotation of shaft 86 will impart a counterclockwise rotation to shafts 83 and 85. The rotation of shafts 83, 85 and 86 will be synchronized by the timing belts or chains 124 and 129. The web 1 is drawn through the rotary shear preferably (but not necessarily) at the same speed as the peripheral speed of the blades. The web may be drawn through the rotary shear by well known means driven by the same prime mover which drives the blade shafts.

Figure 20:
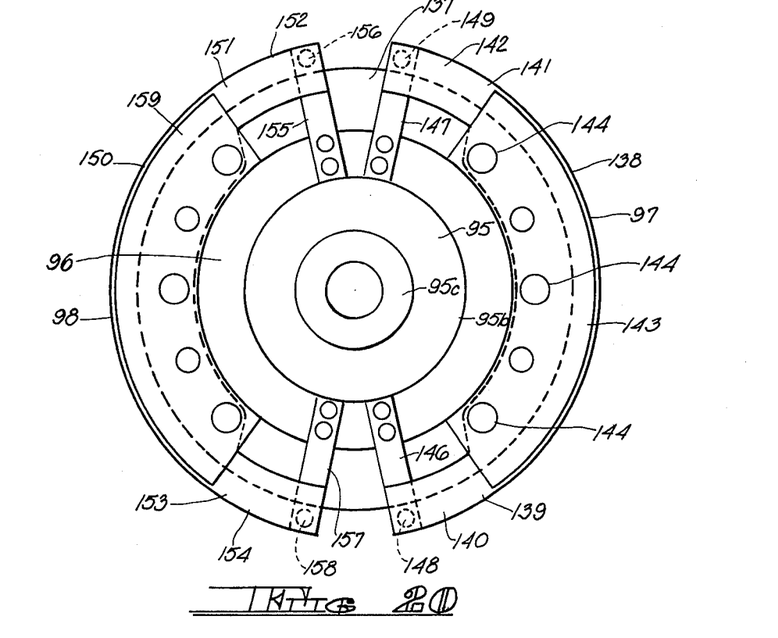
FIG. 20 is an elevational view of an upper blade and support assembly of the rotary shear of FIG. 18.
Figure 21:
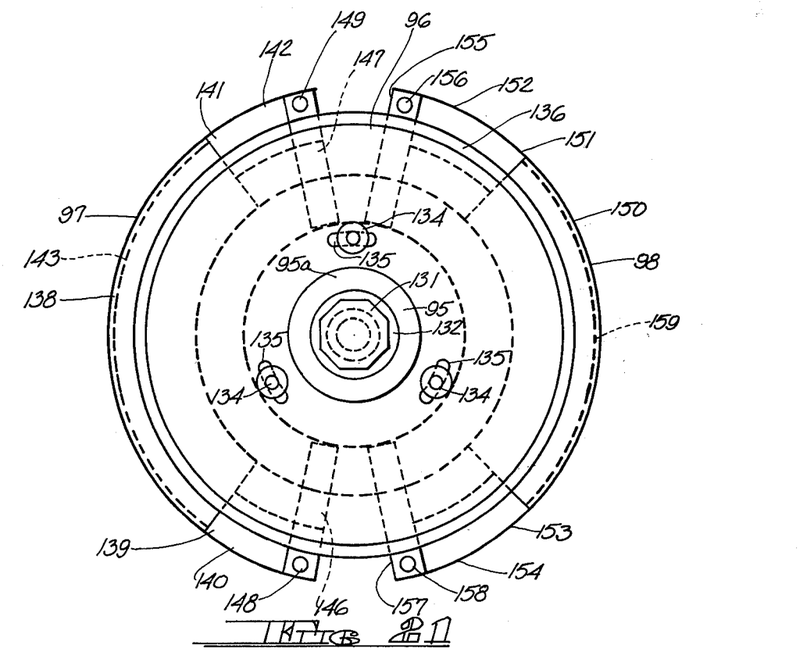
FIG. 21 is an elevational view similar to FIG. 20 but illustrating the opposite side of the blade and support assembly.

In FIGS. 20 and 21 the hub 95, blade support 96 and blades 97 and 98 are shown. The hub 95 is non-rotatively affixed to shaft 85 by any suitable means. For example, it may be held in place at its forward end by bolt 131 and washer 132, the bolt being threadedly engaged in the end of shaft 85. At its rearward end, the hub 95 may be provided with a set screw 133 or the like.

The hub 95 has a forward portion 95a, followed by a central portion 95b of larger diameter and a rearward portion 95c of somewhat smaller diameter than the forward portion. A shoulder 95d is formed between the forward portion 95a and central portion 95b of the hub. The blade support 96 comprises a disc having a central opening to receive the forward portion 95a of hub 95. The blade support 96 seats against the hub shoulder 95d and is bolted thereto by bolts 134 passing through slots 135 in the blade support. The slots enable the blade support 96 to be rotatively adjusted with respect to the hub 95.

The inner face of the blade support 96 is substantially planar, the peripheral edge being slightly beveled rearwardly, as at 136. The outer surface of blade support 96 (i.e. that surface bearing against hub shoulder 95d) is again substantially planar. The outer face is provided with a wide conical surface 137 (see FIGS. 18 and 20) extending to its peripheral edge. The blades 97 and 98 are affixed to this conical surface.

Figure 22:
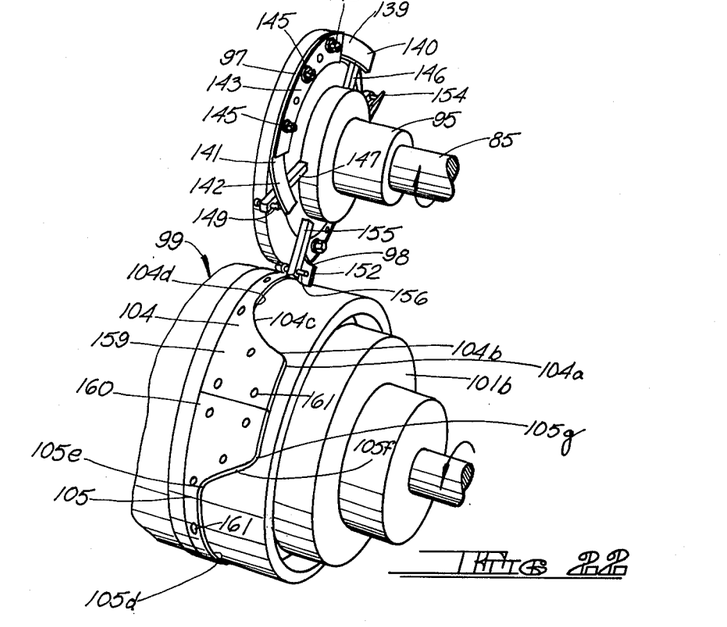
FIG. 22 is a fragmentary perspective view of one pair of cooperating blade and support assemblies of FIG. 18.

As can most clearly be determined from FIGS. 20 and 22, the blade 97 is somewhat similar in configuration to the blade 20 of FIGS. 4 and 5. The blade has a central portion 138 with a curved portion 139 and a substantially straight portion 140 near its leading end. The portion 140 is substantially straight and extends away from blade support 96. In similar fashion, the blade 97 has a curved portion 141 terminating in a substantially straight portion 141 at the trailing end of the blade. Again, the portion 142 extends away from the blade support 96.

A hold-down plate 143 overlies the central portion 138 of blade 97 and is substantially coextensive therewith. Hold-down plate 143 is provided with a plurality of perforations 144, coaxial with mating perforations in the blade (not shown), and adapted to receive bolts 145 (see FIG. 22) which threadedly engage in corresponding threaded holes in the blade support 96. In this way, the central portion 138 of blade 97 is firmly affixed to the blade support 96.

The curved portions 139 and 141 and the substantially straight portions 140 and 142 of blade 97 are of lesser width than body portion 138 and are resilient in nature. A radially extending bar 146 is affixed to the blade support 96 and underlies the lead end portion 140 of blade 97. In similar fashion, a radially extending bar 147, affixed to the blade support, extends behind trailing end portion 142 of blade 97. The bars 146 and 147 carry at their ends jack screws 148 and 149, respectively. The jack screws form an adjustable support for the blade portions 140 and 142, as can be clearly seen in FIG. 22. As a result, curved portions 130 and 141 and substantially straight portions 140 and 142 of blade 97 are elastically mounted with respect to blade support 96.

Blade 98 is identical to blade 97 and to this end has a central portion 150 terminating at its leading end in a curved portion 151 and a substantially straight portion 152. The substantially straight portion 152 extends away from blade support 96. At its trailing end, blade 98 has a curved portion 153 and a substantially straight portion 154, again extending away from blade support 96. The lead end portion 152 is supported by a bar 155 and jack screw 156. Similarly, the trailing end portion 154 is supported by a bar 157 and jack screw 158. The blade 98 is affixed to the blade support 96 in the same manner described with respect to blade 97, being provided with a hold-down plate 159.

The hub 91 on shaft 83 together with its blade support 92 and blades 93 and 94 are of identical construction to hub 95, blade support 96 and blades 97 and 98. The blade and support means of shaft 83 differs from that of shaft 85 only in that they are oppositely oriented.

Blades 104 and 105, mounted on blade support 99 of shaft 86 are most clearly illustrated in FIG. 22. The blades 104 and 105 are identical. The leading end of blade 104 is shown at 159 while the trailing end of blade 105 is shown at 160. The blades are affixed to the peripheral surface of portion 101b of the cylindrical blade support 99. Blades 104 and 105 each extend substantially one half of the circumference the blade support 99. The leading end of blade 104 lies adjacent the trailing end of blade 105 and it will be understood that at a diametric position on blade support 99 the trailing end of blade 104 will lie adjacent the leading end of blade 105.

The leading end of blade 104 has a lead-in portion 104a leading into a first substantially straight cutting edge portion 104b followed by a curved cutting edge portion 104c and a straight cutting edge portion 104d. It will be understood that the leading end of blade 105 (not shown) will be identically configured, having a lead-in portion similar to portion 104a a substantially straight cutting edge portion equivalent to the cutting edge portion 104b, a curved cutting edge portion equivalent to the curved cutting edge portion 104c and a straight cutting edge portion 105d equivalent to the straight cutting edge portion 104d of blade 104.

The trailing edge of blade 105 has a curved cutting edge portion 105d followed by a substantially straight cutting edge portion 105f and a lead-in (or lead-out) portion 105g. It will be understood that the trailing end of blade 104 will be similarly configured. The blades 104 and 105 are affixed to the portion 101b of blade support 99 by bolts 161.

Figure 23:
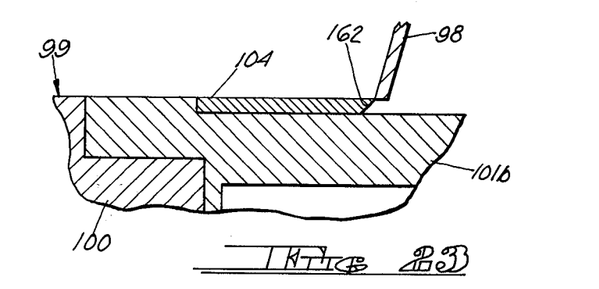
FIG. 23 is a fragmentary cross sectional view of a cooperating pair of first and second blades of the embodiment of FIGS. 18 and 19.

FIG. 23 is a cross sectional view taken through the cooperating pair of blades 98 and 104. It will be evident that the blade 104, constituting a fixed blade, is of the nature of an anvil blade fixedly mounted to the portion 101b of blades support 99. The blade 104 (and the blade 105) are undercut adjacent its cutting edge as at 162, providing clearance for blade 98. The fact that blade 98 is conical and mounted on conical surface 137 provides clearance for blade 104.

Since the upper blades 97 and 98 bear a skewed relationship to their cooperating lower blades 105 and 104, they will again coact with a single point contact shifting along their cutting edges during a shearing operation. FIG. 23 illustrates such a point contact between blades 98 and 104. When the leading ends of blades 98 and 104 initiate a shearing operation, the point contact will be maintained throughout the cutting edges of the leading end portions of these blades by virtue of the fact that the leading end of blade 98 will shift slightly away from its jack screw. The same action occurs between the trailing ends of the blades 98 and 104, again maintaining the single point contact between the blade cutting edges during the shearing of the web. In this manner, the upper blades 97 and 98 with their resilient and elastically mounted leading and trailing ends correspond to the elastically mounted blade 20 of FIG. 1. The fixedly mounted blades 104 and 105 correspond to the fixedly mounted blade 24 of FIG. 1.

It will be understood that the upper blades 93 and 94 will coact with lower blades 102 and 103 in the same manner just described. The embodiment of FIGS. 18 through 23 is illustrated as set up to form elongated notches 2 and 3 in the web 1 of FIG. 17. It will again be understood that the number of blades mounted on the cooperating blade supports does not constitute a limitation on the present invention. A rotary shear of the type described with respect to FIGS. 18 through 23 could be provided with a single pair of cooperating blade holders. Again, the nature of the cuts made through the web and their position with respect to the web can be changed by appropriate location of the cooperating blade and blade support assemblies and by appropriate configuration of the blades. The advantages described with respect to the embodiment of FIGS. 1 through 16 obtain for the embodiment of FIGS. 18 through 23. The embodiment of FIGS. 18 through 23 has the added advantage that its upper and lower blades are more easily manufactured.

Modifications may be made in the invention without departing from the spirit of it.

The embodiments of the invention in which an exclusive property or privilege is claimed are defined as follows:

1. A rotary shear for making clean and complete cuts in a continuously moving web, said cuts being straight cuts parallel to the direction of movement of said web, straight cuts lying at an angle to the direction of movement of said web, curved cuts of combinations thereof, said shear comprising first and second rotatable shafts, a first blade support non-rotatively affixed on said first shaft, a first arcuate blade mounted on said first blade support, a second blade support non-rotatively affixed on said second shaft and a second arcuate blade mounted on said second blade support, one of said first and second blades being flexible and in part at least elastically mounted on its respective one of said first and second blade supports, said first and second blades comprising a cooperating pair of blades having cutting edges of equal length all points along which are spaced from the axis of their respective one of said first and second shafts by the same radial distance, said blade cutting edges being configured to make the desired cuts through said web, the axes of said first and second shafts lying in parallel horizontal planes so spaced and in vertical planes which intersect at an angle such that said first and second blades are skewed with respect to each other at an angle of from about 1° to about 6° and will have single point cutting contact throughout the length of their cutting edges, and means to rotate said shafts in timed relationship so that said first and second blades will properly coact.

2. The structure claimed in claim 1 wherein one of said first and second blades is flexible and is in part at least elastically mounted to its respective one of said first and second blade supports, the other of said first and second blades being fixedly mounted to its respective one of said first and second blade supports.

3. The structure claimed in claim 1 including more than one arcuate blade mounted on at least one of said first and second blade supports, means to rotate said shafts in timed relationship so that a blade on said first blade support and a blade on said second blade support coact during each shearing operation.

4. The structure claimed in claim 1 wherein said means to rotate said shafts rotates said shafts at such a speed that the peripheral speed of said blades equals the speed of said continuously moving web.

5. The structure claimed in claim 1 including a third rotatable shaft, a third blade support non-rotatively affixed to said third shaft, a third arcuate blade mounted on said third blade support, a fourth blade support non-rotatively affixed to said second shaft in spaced relationship, a fourth arcuate blade mounted on said fourth blade support, one of said third and fourth blades being flexible and in part at least elastically mounted on its respective one of said third and fourth blade supports, said third and fourth blades comprising a second cooperating pair of blades having cutting edges of equal length all points along which are spaced from the axes of their respective one of said second and third shafts by said same radial distance, said cutting edges of said third and fourth blades being configured to make the desired cuts through said web, said third and fourth blades being oppositely oriented from said first and second blades, the axis of said third shaft lying in the same horizontal plane as said axis of said first shaft, said axes of said second and third shafts lying in vertical planes which intersect at an angle such that said third and fourth blades are skewed with respect to each other at an angle of from about 1° to about 6° and will have single point contact throughout the length of their cutting edges, said skew of said third and fourth blades being oppositely directed with respect to said skew of said first and second blades, and means to rotate said third shaft in timed relationship to said second shaft so that said third and fourth blades coact properly.

6. The structure claimed in claim 2, wherein said one of said first and second blades is flexible and is elastically mounted throughout its length on its respective one of said first and second blade supports.

7. The structure claimed in claim 4 wherein said web speed is from about 200 to about 600 feet per minute.

8. The structure claimed in claim 5 wherein one of said blades of said first mentioned cooperating pair and one of said blades of said second cooperating pair are flexible and are in part at least elastically mounted to their respective blade supports, the other blade of each of said cooperating pairs being fixedly mounted to its blade support.

9. The structure claimed in claim 5 wherein said second and fourth blade supports comprise an elongated unitary cylindrical member non-rotatively mounted on said second shaft, said second and fourth blades being affixed to said cylindrical member near its ends, said second and fourth blades each being an arcuate plate-like member one face of which lies in abutting relationship with the peripheral surface of said cylindrical member and the cutting edge of which is located at the junction of the other face thereof and the edge thereof nearest the adjacent end of said cylindrical member.

10. The structure claimed in claim 5 wherein said means to rotate said shafts rotates said shafts at such a speed that the peripheral speed of said blades equals the speed of said continuously moving web.

11. The structure claimed in claim 5, wherein said first and second coacting blades are configured to produce spaced elongated notches along one edge of said web, said third and fourth coacting blades being configured to produce spaced elongated notches along the other edge of said web, each of said notches having a first edge portion extending diagonally of said web and inwardly of its respective web edge, said first notch edge portion terminating in a second curved notch edge portion leading into a third straight notch edge portion parallel to the direction of web movement, said third notch edge portion leading into a fourth curved notch edge portion terminating in a fifth notch edge portion extending diagonally of said web outwardly to said last mentioned web edge, each of said first, second, third and fourth arcuate blades having a leading end with a first substantially straight cutting edge portion and a curved cutting edge portion corresponding respectively to said first and second notch edge portions, a main body portion with a straight cutting edge corresponding to said third notch edge portion and a trailing end with a first curved portion and a second substantially straight portion the cutting edges of which correspond respectively to said fourth and fifth notch edge portions.

12. The structure claimed in claim 8 wherein said one blade of said first mentioned cooperating pair and said one blade of said second cooperating pair are flexible and elastically mounted to their respective blade supports throughout their length.

13. The structure claimed in claim 10 wherein said web speed is from about 200 to about 600 feet per minute.

14. The structure claimed in claim 11 wherein said first and third shafts are positioned to lie to one side of said web, said second shaft being positioned to lie to the other side of said web and extending perpendicular to the direction of web movement.

15. The structure claimed in claim 14 wherein said blade supports are of disc-like configuration, each of said blades being mounted on one face of its respective blade support with its cutting edge extending beyond the periphery of its blade support.

16. The structure claimed in claim 14 wherein said first and third blade supports are of disc-like configuration, said first and third blades being mounted on one face of said first and third blade support respectively with the cutting edge of each extending beyond the peripheral edge of its respective one of said first and third blade supports, said second and fourth blade supports comprising an elongated cylindrical member non-rotatively mounted on said second shaft, said second and fourth blades being affixed to said cylindrical member near its ends, said second and fourth blades each being an arcuate plate-like member, one face of which lies in abutting relationship with the peripheral surface of said cylindrical member and the cutting edge of which is located at the junction of the other face thereof and the edge thereof nearest the adjacent end of said cylindrical member.

17. The structure claimed in claim 15 wherein said first and third blades are flexible and are elastically affixed throughout their length to said first and third blade supports respectively.

18. The structure claimed in claim 16 wherein said first and third blades have their main body portions fixedly mounted to their respective one of said first and third blade supports, the lead and trailing ends of said first and third blades being elastically mounted, said second and fourth blades being fixedly mounted to said cylindrical member.

19. The structure claimed in claim 18 wherein said first and third blade supports have two identical blades identically mounted thereon and said cylindrical member has two identical blades identically mounted near each of its ends.

20. A process of making clean and complete cuts in a continuously moving web of thin, pliable, compliant, cut-resistant material, said cuts being straight cuts parallel to the direction of movement of said web, straight cuts lying at an angle to the direction of movement of said web, curved cuts or combinations thereof, said process comprising the steps of providing first and second rotatable shafts, non-rotatively affixing to said first shaft a first blade support with a first arcuate blade mounted thereon, non-rotatively affixing to said second shaft a second blade support with a second arcuate blade mounted thereon, one of said first and second blades being resilient, mounting said one of said first and second blades in part at least elastically its respective one of said first and second blade supports, said first and second blades having cutting edges of equal length all points along which are spaced from the axis of their respective one of said first and second shafts by the same radial distance, configuring said cutting edges of said first and second blades to make the desired cuts through said web, so spacing and so angling said axis of said first and second shafts that said first and second blades are skewed with respect to each other at an angle of from about 1° to about 6° and will have single point cutting contact throughout the length of their cutting edges and rotating said first and second shafts in timed relationship so that said first and second blades properly coact.

21. The process claimed in claim 20 including the steps of locating said axes of said first and second shafts in parallel spaced horizontal planes and in vertical intersecting planes to produce said skew of said blades.

22. The process claimed in claim 20 including the step of elastically mounting said flexible blade throughout its length to its respective one of said blade supports.

23. The process claimed in claim 20, including the step of rotating said first and second shafts at a speed such that the peripheral speed of said blades equals the speed of said continuously moving web.

24. The process claimed in claim 20 wherein said web is a lamination of a plastic layer and a fibrous layer.

25. The process claimed in claim 23 wherein said speed of said continuously moving web is from about 200 to about 600 feet per minute.

* * * * *

UNITED STATES PATENT AND TRADEMARK OFFICE
CERTIFICATE OF CORRECTION

PATENT NO. : 4,061,063
DATED : December 6, 1977
INVENTOR(S) : John B. Brush

It is certified that error appears in the above-identified patent and that said Letters Patent are hereby corrected as shown below:

Column 7, line 22, "is" should read -- in --.

Column 11, line 55, "130" should read -- 139 --.

Column 12, line 32, "edge" should read -- end --.

Column 13, line 28, "of", second occurrence, should read -- or --.

Signed and Sealed this

Fourth Day of April 1978

[SEAL]

Attest:

RUTH C. MASON
Attesting Officer

LUTRELLE F. PARKER
Acting Commissioner of Patents and Trademarks